June 23, 1959     H. BISBY ET AL     2,891,699
LIQUID METERING APPARATUS
Filed June 18, 1956
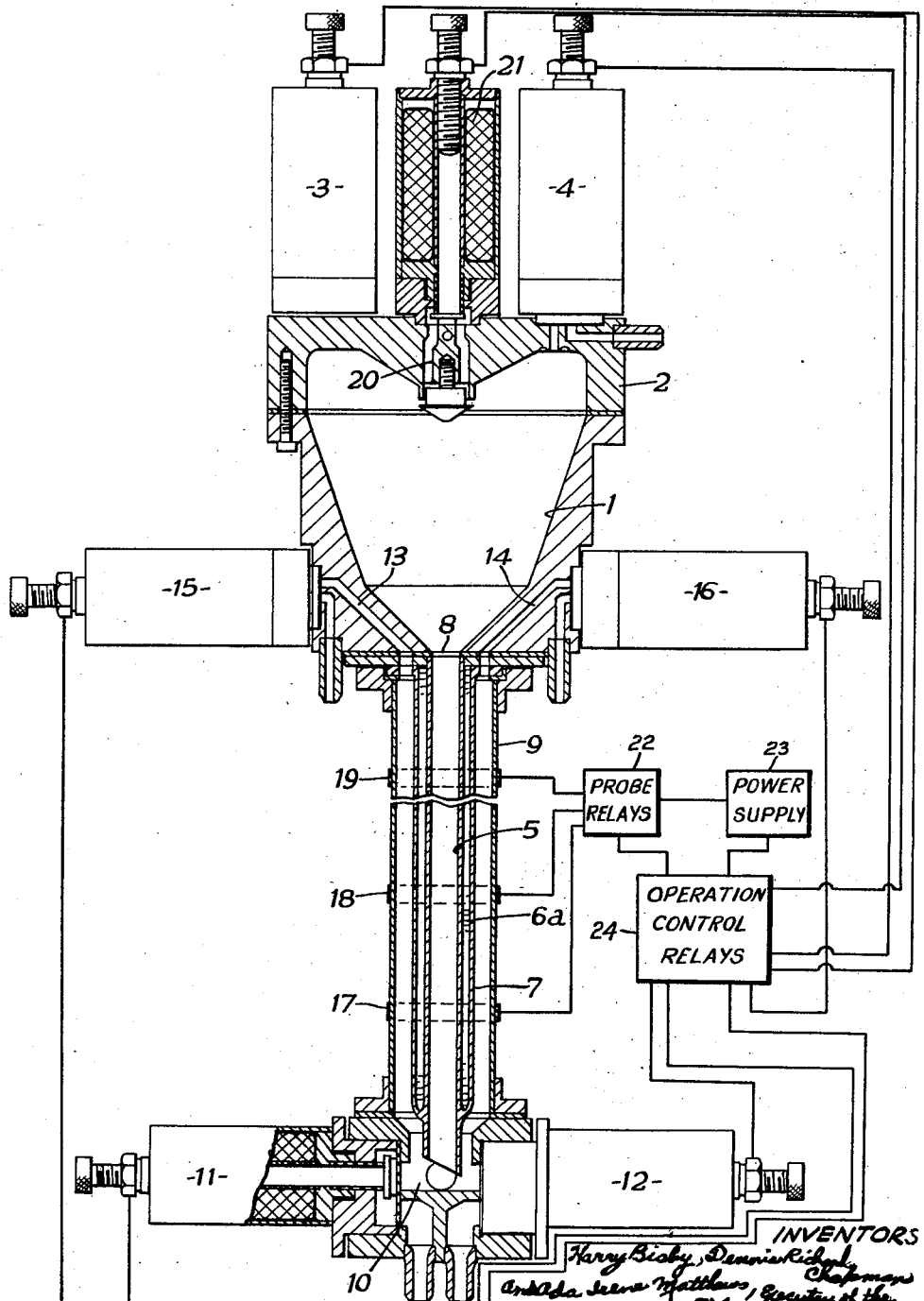

United States Patent Office 2,891,699
Patented June 23, 1959

2,891,699
LIQUID METERING APPARATUS

Harry Bisby, Drayton, Dennis Richard Chapman, London, England, and Stephen John Matthews, deceased, late of Cheam, England, by Ada Irene Matthews, executrix, Cheam, England; said Ada Irene Matthews assignor to Baird & Tatlock (London) Limited, Chadwell Heath, England, a company of Great Britain Application June 18, 1956, Serial No. 592,102

Claims priority, application Great Britain June 16, 1955

4 Claims. (Cl. 222—56)

This invention relates to liquid metering apparatus for measuring a predetermined quantity of liquid.

It is sometimes desirable, in chemical and other plants, for routine analysis of substances being manufactured or utilised during a manufacturing process to be effected automatically at predetermined time intervals and the results of such analysis recorded on a chart or by other means. Various machines for this type of routine analysis have been proposed and the present invention is particularly, although not exclusively, concerned with metering apparatus for use in such a machine where it is desired to mix together predetermined quantities of a number of liquids in a reaction vessel subsequently passing the product of the reaction through a testing device for example an absorptiometer, washing the reaction vessel and repeating the process at predetermined time intervals, the output from the testing device being recorded on a continuously movable chart.

According to the present invention there is provided metering apparatus for liquids comprising a chamber in which liquid to be measured is introduced under the control of valve means, a first tube communicating with the lower part of the chamber and extending downwardly therefrom and a second tube communicating with the lower end of the first tube and extending upwardly therefrom and means for sensing the liquid level in said second tube to control the operation of said valve means. Preferably the first and second tubes are arranged concentrically and the sensing means comprises capacitor probes located at predetermined positions along the wall of said second tube.

The invention will be better understood from the following description of one embodiment thereof when read in conjunction with the accompanying drawing, the single figure of which shows one form of metering device according to the invention.

Referring to the drawing the device comprises a reaction chamber 1 the upper part of which is closed by a head 2 on which a number of sample and reagent valves such as 3 and 4 are located. These valves are electro-magnetically operated by control means which may, for example, comprise an electronic sequencing unit.

A first tube 5 having double walls 6 and 7 is secured to the lower part of the reaction chamber 1 and its bore registers with an aperture 8 formed therein. A second tube 9 is also secured to the lower end of the reaction chamber 1 and concentrically surrounds the tube 5. The lower ends of the tubes 5 and 9 communicate with a space 10 which also communicates with electro-magnetically controlled liquid exhaust valves such as 11 and 12.

Electro-magnetically operated gas admission valves such as 15 and an air exhaust valve 16 are secured to the reaction chamber 1 adjacent its lower end and communicate respectively through channels such as 13 and 14 with the space between the tubes 5 and 9.

The space between the walls 6 and 7 of the tube 5 is filled with mercury 6a and a number of annular probes 17, 18 and 19 are located at predetermined positions on the outer surface of the tube 9.

A valve controlled spray entry 20 for washing water is located centrally of the head of the reaction chamber 1, this entry being controlled by an electro-magnetically operated valve 21.

An electronic sequencing unit is provided, and may comprise, for example, probe relays generally designated 22 connected to the probes 17, 18 and 19 and to a power supply 23. The probe relays 22 and power supply 23 are also connected with operation control relays, generally designated 24, which latter are connected with the electromagnetically operated valves 3, 4, 11, 12, 15, 16, 21.

In operation liquids pass from the valves 3 and 4 through the chamber 1 and down the central tube 5 to the space 10. The liquid exhaust valves 11 and 12 are closed during this period so that the liquids rise steadily up the space between the tubes 5 and 9 and as the level of the liquid rising in this space reaches each successive annular probe 17, 18 and 19 the opening and closing of the valves is controlled through for example the electronic sequencing unit. It will be appreciated that since the liquids pass downwardly through the central tube 5 and then upwardly in the space between this tube and the tube 9 little turbulence is caused and the volumes of the various liquids can be determined with great accuracy. To assist correct volume measurement the tube 5 is formed with hollow walls filled with mercury to constitute an electro-static screen which may, if desired, be earthed.

During the filling of the apparatus displaced air escapes through the exhaust valve 16 although this valve is arranged to be closed during any mixing operation when gas is admitted through the valve 15. In this latter case the gas pressure forces the liquid back up the centre tube 5 and into the chamber 1 where it bubbles through the liquid and escapes through a vent (not shown) in the upper part of the chamber. The gas may be air or some other gas necessary to the particular reaction concerned, for example hydrogen in the case of a reduction process.

At the end of the reaction period which is, generally time controlled, the reaction products are drawn off from the apparatus through one or more of the exhaust valves such as 11 and 12 and fed for example to an absorptiometer. Immediately after the reaction products have been drawn off another of the valves such as 11 and 12 connected to a drain is opened and the apparatus flushed with washing water through the spray-type valve 20 so that the apparatus is ready for testing a further sample. The absorptiometer vessels are preferably washed while the liquids are being mixed so as to save time and reduce the necessary gap between the testing of samples.

What we claim is:

1. Metering apparatus for liquids comprising a chamber having an inlet, and an outlet orifice at a lower part thereof, valve means operatively connected to said inlet to control the admission of liquid into said chamber, a first tube connected with and extending downwardly from said chamber and being in fluid communication with said outlet orifice, a second upwardly extending tube, means fluid connecting the lower end of said first tube with the lower end of said second tube, valve controlled conduit means communicating with said second tube at the upper end thereof whereby a gaseous fluid may be introduced into said second tube, means in operative relationship with said second tube to sense the level of liquid therein, and means connecting said sensing means to said inlet valve means for control of the valve means in accordance with the level of liquid in said second tube.

2. Metering apparatus for liquids comprising a chamber having a plurality of inlets, and an outlet orifice at a lower part thereof, inlet valve means operatively connected to each of said inlets to control the admission of a plurality of liquids into said chamber, a first tube connected with and extending downwardly from said chamber and being in fluid communication with said outlet orifice, a second tube surrounding said first tube, means fluid connecting the lower end of said first tube with the lower end of said second tube, exhaust valve means operatively connected with said fluid connecting means, valve controlled conduit means communicating with said second tube at the upper end thereof whereby gaseous fluid may be introduced into said second tube, means in operative relationship with said second tube to sense the level of liquid therein and means connecting said sensing means to said inlet valve means, said exhaust valve means and said valve controlled conduit means for control thereof in accordance with the level of liquid in said second tube.

3. The apparatus of claim 2 in which said first tube is double walled and the space between said walls contains mercury.

4. The apparatus of claim 2 and further comprising a valve controlled spray entry in said chamber whereby washing water may be introduced into said chamber.

References Cited in the file of this patent

UNITED STATES PATENTS

| | | |
|---|---|---|
| 2,472,389 | Von Stoeser | June 7, 1949 |
| 2,687,740 | Jarund | Aug. 31, 1954 |